United States Patent [19]

Drew et al.

[11] 4,183,015

[45] Jan. 8, 1980

[54] SIDE GUARD FOR BED INCLUDING MEANS FOR CONTROLLING REMOTE ELECTRICAL DEVICES

[75] Inventors: William D. Drew, Batesville; Leslie D. Foster, Brookville, both of Ind.; Dennis J. Gallant, Cincinnati, Ohio

[73] Assignee: Hill-Rom Company, Inc., Batesville, Ind.

[21] Appl. No.: 919,327

[22] Filed: Jun. 26, 1978

[51] Int. Cl.[2] .................... H04Q 1/00

[52] U.S. Cl. .................... 340/286 R; 340/310 R

[58] Field of Search .................... 340/286 R

[56] References Cited

U.S. PATENT DOCUMENTS

| | | | |
|---|---|---|---|
| 3,517,120 | 6/1970 | Bunting | 340/286 X |
| 3,932,903 | 1/1976 | Adams | 5/100 |

*Primary Examiner*—Harold I. Pitts

*Attorney, Agent, or Firm*—Haight, Hofeldt, Davis & Jambor

[57] ABSTRACT

A bed side guard that is rotatable between an elevated and lowered position is provided with means for controlling remote electrical devices such as radio, television, room light, nurses' call station, room environment control and intercommunication system. Thus, a variety of remote devices can be operated and controlled by control means that are always immediately accessible and viewable by the occupant of the bed.

16 Claims, 5 Drawing Figures

SIDE GUARD FOR BED INCLUDING MEANS FOR CONTROLLING REMOTE ELECTRICAL DEVICES

BACKGROUND OF THE INVENTION

1. Field of the Invention

The present invention relates to side guards for beds, and more particularly, to side guards for hospital beds and the like that incorporate means for controlling remote electrical devices.

2. Description of the Prior Art

Side guards for hospital beds and the like are well known in the art. For example, U.S. Pat. No. 3,932,903-Adams et al. (assigned to the same assignee as the present invention) relates to a side guard that is rotatable between an elevated position and a lowered position and slidable from the lowered position to a position underneath the bed. The Adams et al. patent also discloses the mounting of electrical switches on a side guard for controlling the electrical motors which raise and lower the head and foot portions of the bed.

Heretofore in the art, the means for controlling remote electrical devices such as radio, television, nurse's call light, intercommunication system, room lights, environment controls, etc. have either been remotely mounted apart from the bed or have been mounted on a bedside pendant or control box pinned or otherwise attached in some manner to the bedding in a position where the patient could reach it. Unfortunately, control consoles mounted in bedside stands and the like typically are expensive and often not very accessible to patients suffering from motion-restricting illnesses or injuries. Moreover, mounting the controls in a pendant or control box attached to the bedding often interferes with patient movement or results in difficult operation when in a position where the patient cannot see and easily operate the controls. Moreover, control pendants often fall to the floor becoming contaminated and are subject to damage if dropped. Also, vomit, urine, food or beverage can damage such bed pendants.

Thus, it would be a desirable advance in the art to provide a means for mounting controls for remote electrical devices on a hospital bed or the like in a position where they are both easily accessible and viewable by the occupant of the bed and avoid the deficiencies of the prior art.

BRIEF DESCRIPTION OF THE INVENTION

The present invention is an improvement for use in connection with a side guard structure for a bed of the type including a side guard for preventing accidental egress from the bed, means for mounting the side guard to the bed, and means for allowing the side guard to be moved from an elevated position to a lowered position to allow access to the bed.

The improvement of the present invention comprises control means mounted on the side guard in a position accessible and viewable by anyone lying on the bed. The control means is connectable to at least one selectable electrical device remote from the bed for permitting control of the operation of the remote electrical device from the bed.

Remote electrical devices that may be so controlled may comprise a radio, a television, a room light dimmer, a nurse's call light, a room environment control or an intercommunication system. An acoustical speaker may also be mounted on the side guard and used either in connection with the intercommunication system, or as a local speaker output for the radio or television.

The side guard may also include plug receptacles for receiving jacks connected to patient monitoring means such as electrodes and the like that are attachable to the patient. Means for connecting the plug receptables to remote monitoring devices are provided so that the patient's functions can be monitored.

Thus, it is a principle object of the present invention to provide a side guard structure for a bed having means mounted therein in a position easily accessible and viewable by anyone lying on the bed for controlling remote electrical devices.

It is yet another object of the present invention to provide a side guard structure for a bed having plug receptacles therein being connectable to patient monitoring devices, and means for operably connecting remote monitoring devices to the plug receptacles to permit monitoring of various medical functions of a patient on the bed.

These and other objects, advantages, and features shall hereinafter appear, and for the purposes of illustration, but not for limitation, an exemplary embodiment of the present invention is illustrated in the accompanying drawings and described in the following detailed description.

DETAILED DESCRIPTION OF THE PREFERRED EMBODIMENT

Figure 1:
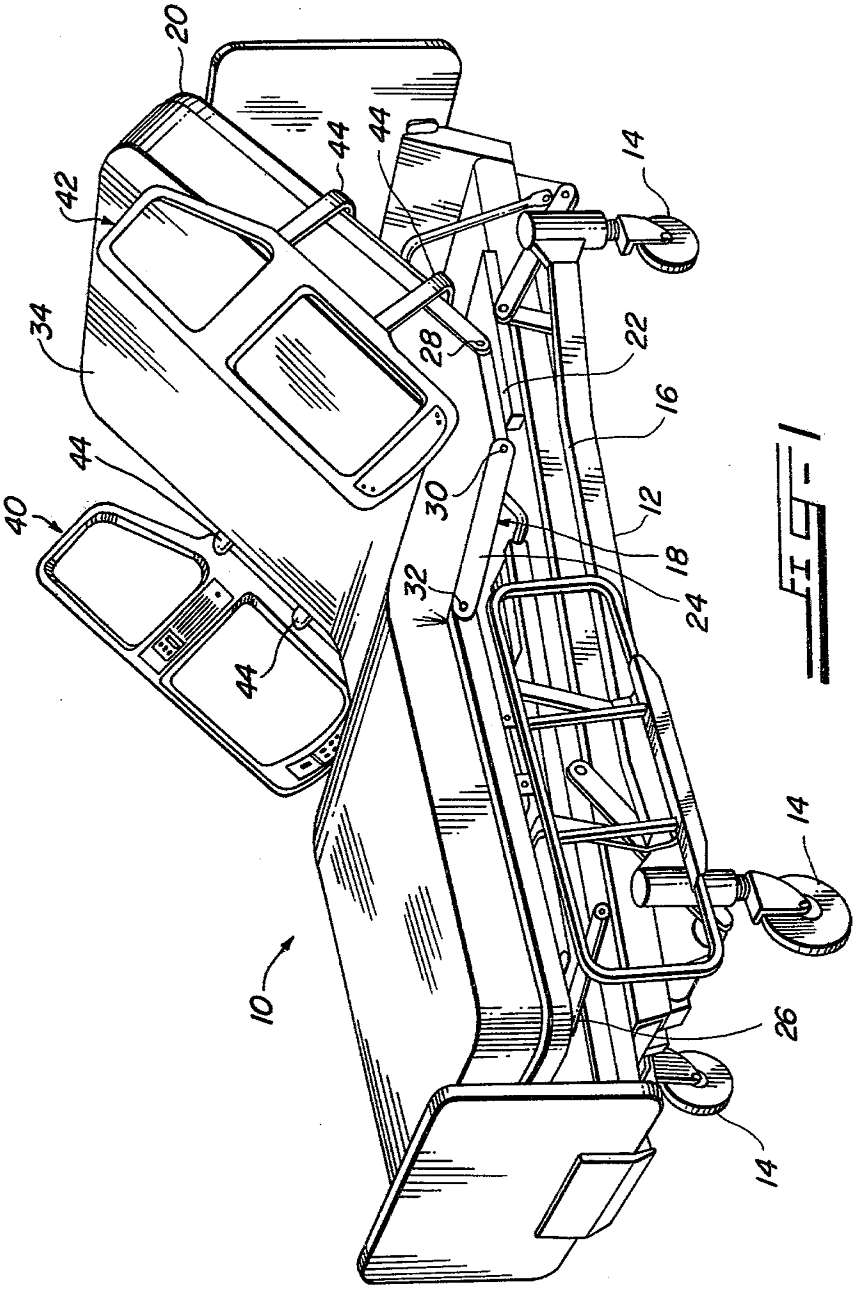
FIG. 1 is an upper right front perspective view of a bed having improved side guards in accordance with the present invention.

With reference to FIG. 1, bed 10 generally comprises a base frame 12 mounted on rollers 14 for easy moveability. Supported by base frame 12 is an elevating frame assembly 16 which incorporates structure that allows the bed to be elevated, lowered, or tilted. Bed 10 is a conventional bed of the type that has found wide application in hospitals and nursing homes.

A mattress support frame assembly 18 is mounted on elevating frame assembly 16, and supports a mattress 34. Mattress support frame assembly 18 is generally divided into four sections, the head section 20, base section 22, mid-leg section 24, and foot section 26. Head section 20 is pivotably mounted to base section 22 at pivot point 28, mid-leg section 24 is pivotably mounted to base section 22 at pivot point 30, and foot section 26 is pivotably mounted to mid-leg section 24 at pivot point 32. Consequently, by operating electrical motors (not shown), mattress support frame assembly 18 can be pivoted and articulated to assume various positions as for example that illustrated in FIG. 1. One typical elevating mechanism for the bed 10 is illustrated in U.S. Pat. No. 3,237,212-Hillenbrand et al. However, any conventional bed structure may be utilized in connection with the present invention.

Mounted on each side of head section 20 of mattress support frame assembly 18 are side guard assemblies 40 and 42. Side guard assemblies 40 and 42 are mounted to head section 20 by arms 44 in such a manner as to allow side guard assemblies 40 and 42 to be moved downwardly below the level of mattress 34 to permit patient or attendant access. Arms 44 and the structure for mounting arms 44 to frame 20 and to side guard assemblies 40 and 42 may comprise the structure as disclosed in U.S. Pat. No. 3,932,903-Adams et al. which allows the side guard assemblies to be rotatable between an elevated and lower position and slidable from the lowered position to a position underneath the bed. However, any suitable mounting structure may be used.

Figure 2:
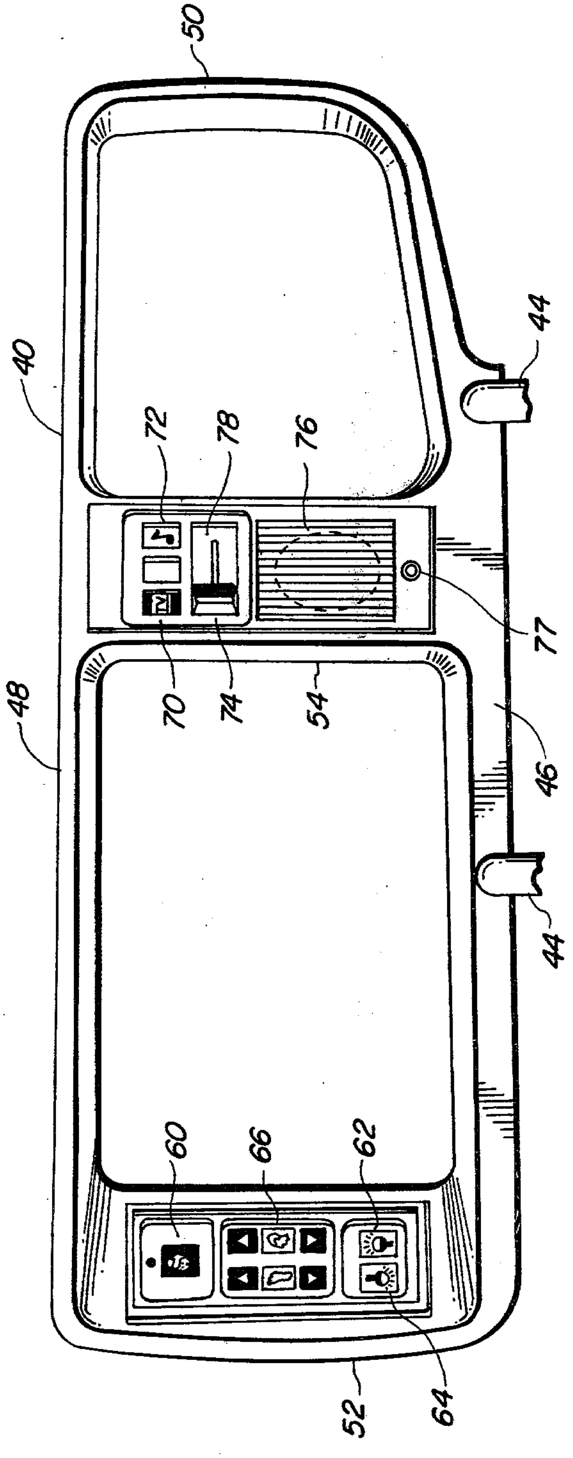
FIG. 2 is a side view of an improved side guard in accordance with the present invention.

With reference to FIG. 2, side guard assembly 40 comprises a bottom section 46, a top section 48, rear section 50, front section 52, and intermediate section 54. Arms 44 are mounted to bottom section 46 as indicated. Bottom section 46, top section 48, rear section 50, front section 52 and intermediate section 54 are all unitarily joined to form a unitary side frame assembly 40 as illustrated in FIG. 2. Mounted in front section 52 are various control means for permitting control of the operation of various remote electrical devices. The control means may comprise a nurse's call button 60 and room light dimmer controls 62 and 64. Patient contact with nurse's call button 60 operates to cause an indicator lamp on a remote console located at a nurses' station to light thereby indicating to the attendant nurse that the patient desires attention. Patient contact with dimmer light control 62 causes the room lights to brighten whereas contact with dimmer light control 64 causes the room lights to dim.

Also mounted on front section 52 substantially in accordance with U.S. Pat. No. 3,932,903-Adams et al. are bed control switches 66 that operate the electrical motors that raise and lower the bed. Such bed control switches are known in the art and do not form a part of the present invention.

Mounted in intermediate section 54 are other control means for remote devices such as a TV control switch 70, radio control switch 72, and a volume control lever 74. An acoustic speaker 76 is also mounted in intermediate section 53. Speaker 76 may be used interchangeably to convey the audio portion of the TV program controlled by switch 70 or the audio of the radio program controlled by switch 72. Movement of lever 74 through groove 78 allows control of the volume of sound transmitted by speaker 76. A plug 77 may be provided to allow an ear phone to be plugged into the system when the speaker 76 might disturb other patients.

Speaker 76 may also be used interchangeably with an intercommunication system controllable from the nurses' station. For example, the patient after actuating nurse's call button 60 could be contacted by the nurse from the nurses' station through speaker 76 so that the patient could communicate the reason for the call through the speaker 76. Speaker 76 could operate as both an output speaker and microphone receiver in the manner well known in the art to allow two-way communication.

Figure 4:
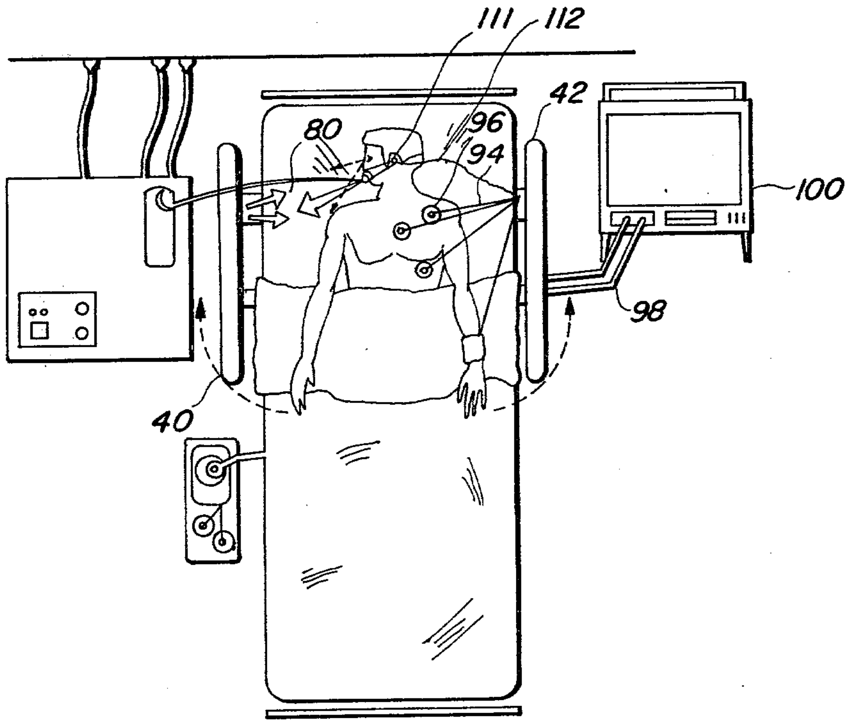
FIG. 4 is a top view of a bed having side guards in accordance with the present invention showing patient location and convenience.

As illustrated in FIG. 4, the patient is always in a reasonably close position to speaker 76 and can easily communicate over speaker 76 as indicated by the arrows 80 which generally designate the oral communication over the intercommunication system.

Figure 3:
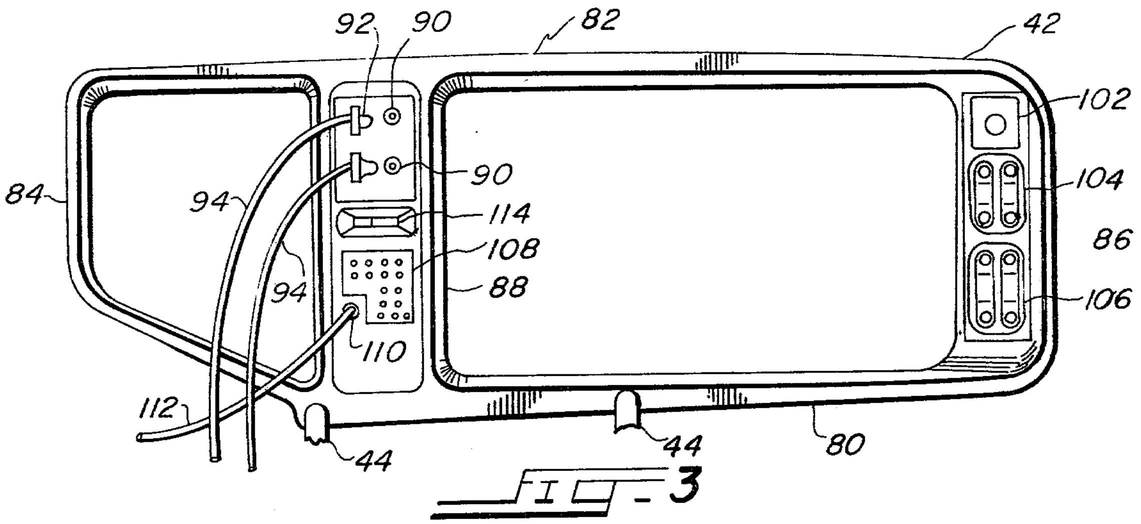
FIG. 3 is a side view of another improved side guard in accordance with the present invention.

With reference to FIG. 3, a side view of side guard assembly 42 is illustrated. Side guard 42 is essentially a mirror image of the shape of side guard 40 and comprises bottom section 80 to which arms 44 are attached, top section 82, rear section 84, front section 86, and intermediate section 88 unitarily joined as illustrated.

Mounted in intermediate section 88 are plug receptacles 90 into which mating jacks 92 can be inserted which are connected to various patient monitoring means by cables 94. The patient monitoring means may be any monitoring device such as for example electrodes 96 (see FIG. 4) attached to the patient. Means are provided to connect the receptacles 90 to electrical cables 98 which are connected to remote monitoring means 100 that might for example be an electronic monitor of heart and respiratory functions. By providing plug receptacles on side guard assembly 42, there is less likelihood that the monitoring cables will get caught in the articulating positions of the bed or get tangled by nurses or other attendants.

Side guard 42 can also be outfitted with certain redundant control means or additional control means at the option of the purchaser. For example, an additional nurse's call button 102, or switches 104 and 106 for bed control and light control can be provided on front section 86 to assure that the patient can have access to these controls even if the patient has injuries or illness that may dehabilitate one or the other of the patient's arms. Correspondingly, intermediate section 88 could be optionally outfitted with a small acoustic speaker 108 and earphone jack 110 to which an earphone 111 and cable 112 could be connected. Also, an alternate volume control 114 could also be incorporated on intermediate section 88 of side guard 42. Alternatively, switches 104 and 106 could be additional control means that control the environmental aspects of the patient's room such as heating and cooling.

Figure 5:
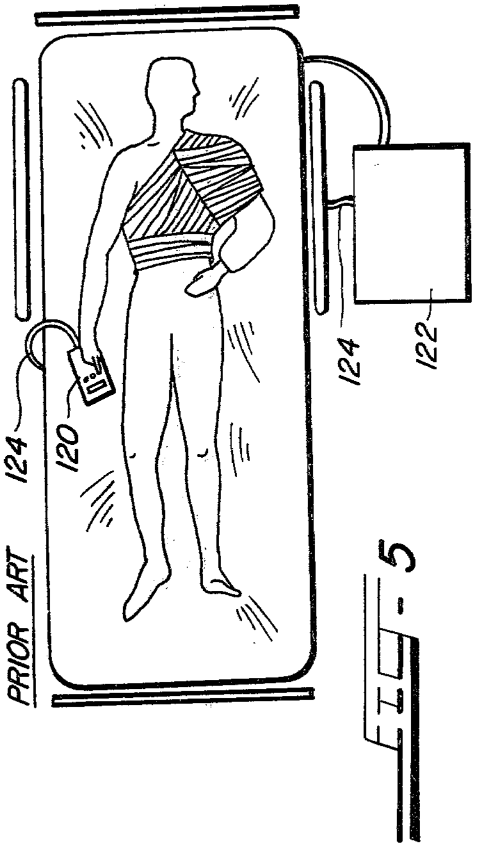
PRIOR ART FIG - 5
FIG. 5 is a top view of a bed having prior art controls associated therewith.

With reference to FIG. 5, of the typical prior art arrangement for controlling the bed and remote electrical devices is illustrated. Typically, in the prior ar, a pendant 120, having bed level controls, a nurse's call button and possibly a remote speaker, is attached to the bedding by a safety pin or some other suitable means in a position accessible to the patient. The difficulty in using such a pendant is that often it is not easily viewable by the patient and can in some instances become accidentally removed from the bedding and fall to the floor. Also, the patient can roll over onto the pendant during sleep causing discomfort as well as making it difficult for the patient to locate and operate the nurses's call button and other controls. The pendant is typically connected to a bedside console 122 via cable 124 which can get caught in the articulating portions of the bed. Console 122 also typically incorporates controls for such devices as radio, television, room environmental controls, light dimmer switches, etc. Console 122 can also include the bed level controls.

As can be seen in FIG. 5, console 122 is not necessarily in a position that is easily accessible by the patient. Consequently, this type of arrangement may not always be suitable for patients of different degrees of illness and injury. The patient is forced to reach outside his bed and sometimes through the side guard to operate most of the important controls.

The present invention provides clear advantages over the prior art arrangement as illustrated in FIG. 5. First, the present invention provides for the controls to be fixed directly to the bed so that there is little possibility of breakage and repair. Moreover, there is no possibility for a cable such as cable 124 being cut by the articulation of the moving portions of the bed during lowering and elevation. Further, the present invention avoids the situation where a contaminated pendant which has falled to the floor is returned to the bed in immediate proximity of the patient with resultant potential infection problems. Moreover, since the various control means are located in a high fixed position relative to the surface of the bed, they do not come in contact with vomit, feces, urine, food, etc. as does the conventional pendant 120 in many instances. This is also true for the acoustic speaker 76 which replaces the conventional pillow speaker which often comes in contact with vomit, food, etc. or falls to the fllor and becomes contaminated. Further, since the controls are substantially above the level of the bed and remain above the level of the bed regardless of bad elevation, the controls are much easier to view by the patient, and always remain in a fixed viewable relationship to the patient. In the prior art arrangement illustrated in FIG. 5, if the head portion of the bed is elevated, the control contained in console 122 may be below the level of the mattress. Further, pendant 120 is on the surface of the bed so that the patient must raise his head to be able to see the pendant.

Another advantage of the present invention is that the side guard assembly is designed so that removal, interchange, and replacement of the various controls is possible since the various controls are modular components. Thus, controls may be easily replaced if service is required, or moved from one side to the other depending on the physical affliction of the patient.

Accordingly, it can be seen that clear and decided advantages exist through utilization of the present invention. Moreover, it should be apparent that various modifications, alterations, and changes may be made to the exemplary embodiment illustrated herein without departing from the spirit and scope of the present invention as defined in the appended claims.

We claim:

1. In a guard structure for a bed of the type including a side guard for preventing accidental egress from the bed, means for mounting the side guard to the bed, and means for allowing the side guard to be moved fron an elevated to a lowered position to allow access to the bed, an improvement comprising:

control means mounted on the side guard in a position accessible and viewable by a person lying on the bed, said control means being connectable to at least one selectable remote electrical device remotely positioned away from the bed and said control means for permitting control of the operation of the remote electrical device from the bed.

2. An improvement, as claimed in claim 1, wherein said at least one remote electrical device comprises a radio.

3. An improvement, as claimed in claim 1, wherein said at least one remote electrical device comprises a television.

4. An improvement, as claimed in claim 1, wherein said at least one remote electrical device comprises a room light dimmer arrangement.

5. An improvement, as claimed in claim 2, wherein an acoustic speaker for said radio is also mounted on the side guard.

6. An improvement, as claimed in claim 3, wherein an acoustic speaker for said television is mounted on the side guard.

7. An improvement, as claimed in claim 1, wherein said remote electrical device comprises a nurses call light arrangement.

8. An improvement, as claimed in claim 1, wherein said at least one remote electrical device comprises an intercommunication system and a local acoustical speaker connected to said intercommunication system is mounted on the side guard.

9. An improvement, as claimed in claim 1, further comprising plug receptacles on said side guard, patient monitoring means connectable to said plug receptacles and means for operably connecting remote monitoring devices to said plug receptacles.

10. An improvement, as claimed in claim 1, wherein said at least one remote electrical device is a room environment control.

11. An improvement, as claimed in claim 1, wherein said control means comprises a radio control.

12. An improvement, as claimed in claim 1, wherein said control means comprises a television control.

13. An improvement, as claimed in claim 1, wherein said control means comprises a room light control.

14. An improvement, as claimed in claim 1, wherein said control means comprises a speaker volume control.

15. An improvement, as claimed in claim 1, wherein said control means comprises a nurses call control.

16. An improvement, as claimed in claim 1, wherein said control means comprises a control for a remote communication system.

* * * * *